United States Patent
Tsao

(10) Patent No.: US 8,812,640 B2
(45) Date of Patent: *Aug. 19, 2014

(54) METHOD AND SYSTEM FOR PROVIDING MULTI-LAYERS ITEM LIST IN BROWSERS WITH SUPPORTING OF CONCURRENT MULTIPLE USERS

(75) Inventor: Sheng Tai (Ted) Tsao, San Jose, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/709,434

(22) Filed: Feb. 19, 2010

(65) Prior Publication Data

US 2010/0211879 A1    Aug. 19, 2010

Related U.S. Application Data

(63) Continuation of application No. 11/374,302, filed on Jul. 2, 2004, now Pat. No. 7,945,652, which is a continuation-in-part of application No. 10/713,904, filed on Aug. 6, 2002, now Pat. No. 7,418,702, and a continuation-in-part of application No. 10/713,905, filed on Aug. 12, 2002, now Pat. No. 7,379,990.

(51) Int. Cl.
G06F 15/173    (2006.01)
G06F 17/30    (2006.01)
G06F 13/10    (2006.01)

(52) U.S. Cl.
CPC ............ *G06F 17/3007* (2013.01); *G06F 13/10* (2013.01)

USPC ............................ 709/223; 709/224; 709/225

(58) Field of Classification Search
USPC ....................................................... 709/219
See application file for complete search history.

(56) References Cited

U.S. PATENT DOCUMENTS

| | | | |
|---|---|---|---|
| 6,966,033 B1* | 11/2005 | Gasser et al. | 715/738 |
| 2002/0023122 A1* | 2/2002 | Polizzi et al. | 709/202 |
| 2003/0088656 A1* | 5/2003 | Wahl et al. | 709/223 |
| 2003/0233571 A1* | 12/2003 | Kraus et al. | 713/200 |
| 2004/0039701 A1* | 2/2004 | Nakamura et al. | 705/42 |
| 2004/0193813 A1* | 9/2004 | Nguyen et al. | 711/156 |
| 2005/0120160 A1* | 6/2005 | Plouffe et al. | 711/1 |
| 2005/0216860 A1* | 9/2005 | Petrov et al. | 715/810 |
| 2005/0240773 A1* | 10/2005 | Hilbert et al. | 713/182 |
| 2010/0312822 A1* | 12/2010 | Howell et al. | 709/203 |

* cited by examiner

*Primary Examiner* — Tom Y Chang

(57) ABSTRACT

Supporting end-user to view and operate computing resources by deploying logically organized and graphically represented multi-layered item list ("tree") has been fully realized on native window based computer user work environment provided by modern operating system such as Windows Explore of Microsoft. The present invention has implemented such tree to represent structured resources, such as for a central controlled distributed scalable virtual machine (CCDSVM), and to be displayable and operable in any web browser on any type of computing system for user to access and manage the actual structured resources. The implementation of the tree is accomplished by creating the tree in memory to mirror the actual structure resource, where the mirrored tree is sent, via web page, to the computing system, where the computing system executes the web browser to display the tree and allow the user to access the actual structured resources via the displayed tree.

41 Claims, 13 Drawing Sheets

A Typical CCDSVM with Multiple Clients (two data paths)

Fig. 1: A Typical CCDSVM with Multiple Clients (two data paths)

Fig. 2 a) A degenerated CCDSVM with a control system station only

Fig. 2, b) The CCDSVM with identical system unit and client host

Fig. 2, c) CCDSVM for non-web based client access and web-based management

Fig. 3) The Software of WCUWE for typical CCDSVM:

Fig. 4: Examples of Multi-Layer Items list:
a) 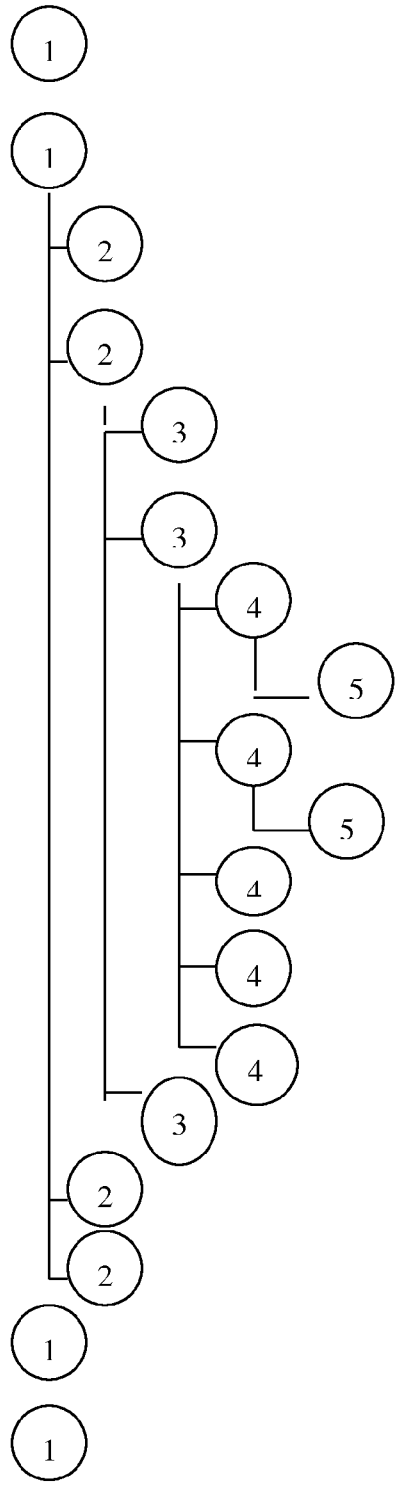 b) 
Fig. 4

Fig. 5, the web based operation menu of WCUWE of CCDSVM
a) Web based drop down menu for disk operation.
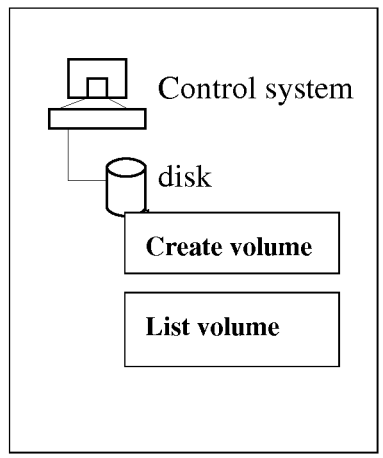
b) Web based selective menu for selecting an system unit:
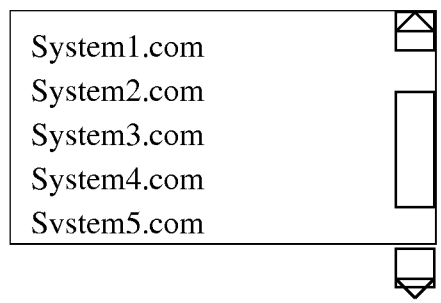

Fig. 6: Examples of web based operation menu for different type of node on MLIL.
a) Shows an operation menu to manage the storage (disk).
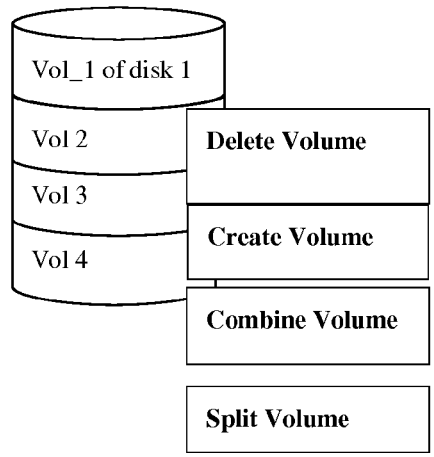
b) Shows an operation menu to manage the file folders.
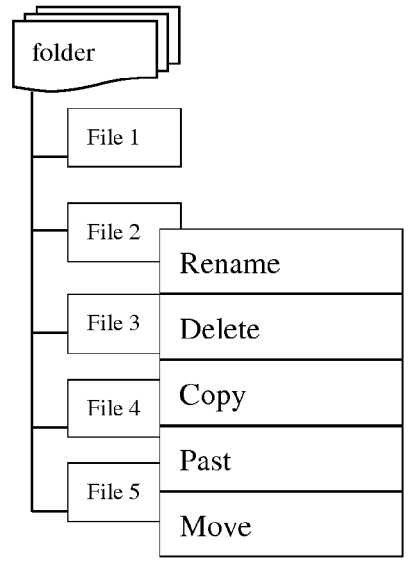

C) Shows an web based operation menu to manage the system unit on network.

Fig. 7: An example of system units automatically and dynamically grouped by group ID.
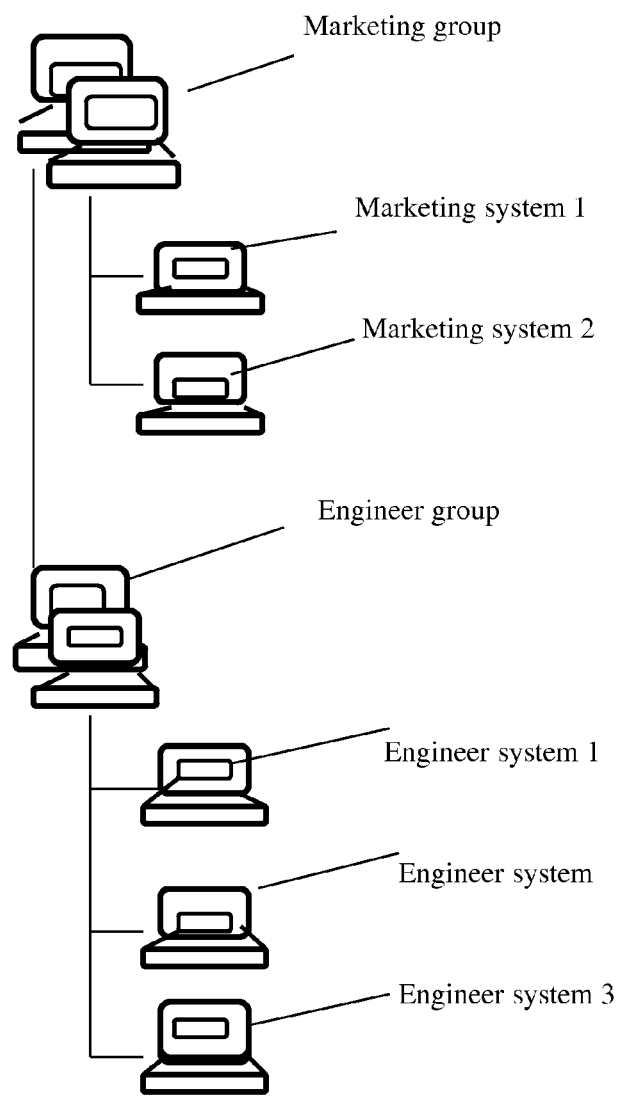

Fig. 8: An example of MLIL combined with mixed devices, system units and groups.
a) This example shows the top level of MLIL is system group, the second level is system unit, the third level is device of disks.
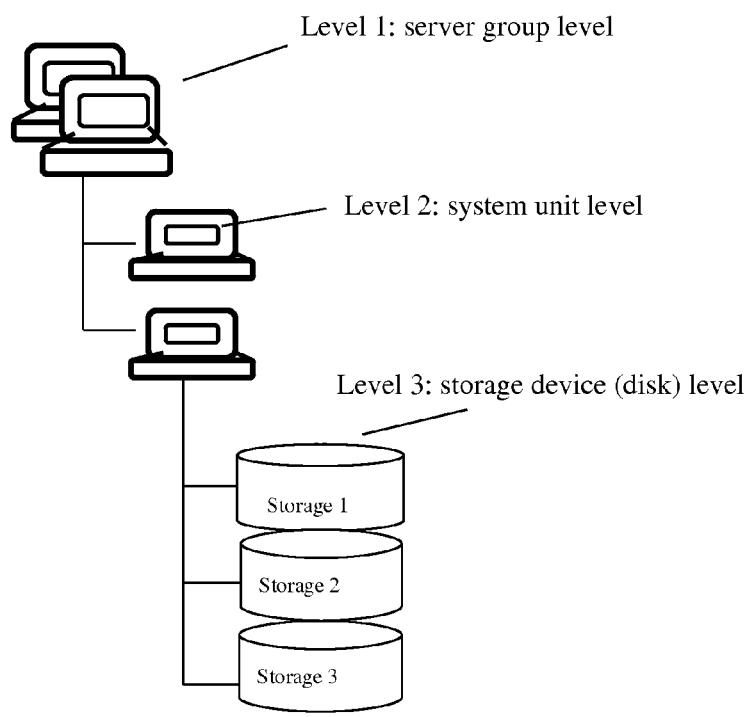

b) This example shows the top level of MLIL is system group, the second level is system unit, the file folder and files start from third level.

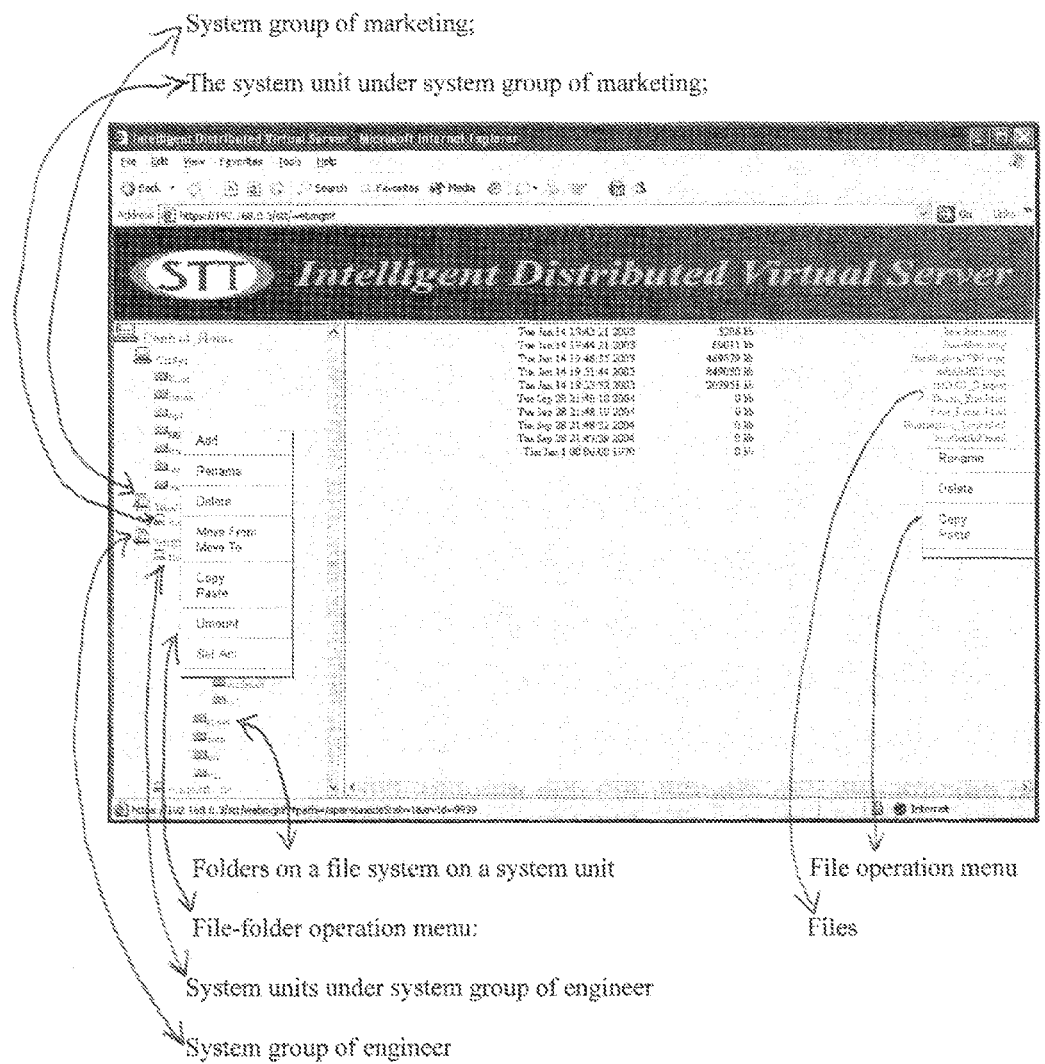
Fig. 9: This figure illustrated an example of how does the file system on computing systems in a group can be accessed.

METHOD AND SYSTEM FOR PROVIDING MULTI-LAYERS ITEM LIST IN BROWSERS WITH SUPPORTING OF CONCURRENT MULTIPLE USERS

PRIORITY AND CROSS REFERENCES

This is a continuation application of U.S. patent application Ser. No. 11/374,302 filed on Jul. 2, 2004, which is converted from the U.S. provisional application No. 60/585,552. The application Ser. No. 11/374,302 is also a continuation-in-part of U.S. patent application Ser. No. 10/713,904, which is filed on Aug. 6, 2002 and is converted from U.S. provisional application Ser. No. 60/401,238, and now is a U.S. Pat. No. 7,418,702. The application Ser. No. 11/374,302 is also a continuation-in-part of U.S. patent application Ser. No. 10/713,905, which is filed on Aug. 12, 2002 and is converted from U.S. provisional application Ser. No. 60/402,626, and now is a U.S. Pat. No. 7,373,990. All above prior applications are incorporated herein by reference in their entireties for all purpose.

BACKGROUND OF THE INVENTION

1. Field of Invention

The present invention is in the area of network communication, and particularly related to multiple users concurrently interacting with multiple computers to display, view, access, operate various resources (e.g., via multi-layers item list) by using a web browser In addition, the present invention is also related to methods and steps of constructing a web-based computer user work environment.

2. Description of Related Art

The evolution of computer-related working environment has changed from paper tape or punch cards of early years to a command line user work environment on a native system in 70th, and to a graphic window environment on a native system in the middle 80th. Since then, there have been some network-based computing environments developed such as Microsoft's terminal service, the Telnet of Unix & Linux system, and etc. These computing environments allow users to access and operate a target system from another remote system. Some network management software has also been developed to mostly focus on monitoring the activities of a target system. However, most of the software are limited in mobility and capability because they need to install the specialized software on the remote system.

There are some web based application software that allows users to access web applications on a web server from a web browser running on a remote system or device. However, most of such application software are not designed for managing resources on a web server and/or for creating a web-based computer user working environment. There are also some web-based software that allow people to manage a system remotely. Again such software is not designed to create a web-based computer user working environment instead of dumping the existing computer user work environment of a system to a web browser on a remote system. Thus there is a need for the user-friendly environment that users can concurrently access and manage resources with ease.

SUMMARY

This section summarizes some aspects of the present disclosure and briefly introduces some aspects in preferred embodiments. Simplifications or omissions in this section as well as in the abstract or the title of the present disclosure may be made to avoid obscuring the purpose of this section, the abstract and the title. Such simplifications or omissions are not intended to limit the scope of the present disclosure.

Generally speaking, the present invention is related to a user-friendly environment that users can concurrently access and manage resources with ease. According to one aspect of the present invention, a web-based computer user working environment (herein "WCUWE") is disclosed. Some aspects of the WCUWE are described in co-pending U.S. application Ser. Nos. 10/713,904 and 10/713, 905, both of which are hereby incorporated by reference in each one's entirety. A central-controlled distributed scalable virtual machine (herein "CCDSVM") is formed to achieve and realize a flexible working environment for users of the CCDSVM. The WCUWE provides a mechanism to allow users to access and operate the provisioned systems of a CCDSVM from any web browser on any remote system or devices. With the capability of expanding a CCDSVM across the Intranet and Internet with its strong security control, the WCUWE can meet the increasing demand for a more secure, more mobilized, more flexible and more cost saving computational solution.

BRIEF DESCRIPTION OF THE FIGURES

These and other features, aspects, and advantages of the present invention will become better understood with regard to the following description, appended claims, and accompanying drawings where:

FIG. 4 shows a simplified example of a multi-layered item list;

FIG. 5 shows some examples of an operation menu for WCUWE;

FIG. 7 shows an example of server units grouped by a group ID;

FIG. 9 shows an example of how the file system on a system unit 3 in a group can be accessed.

DETAILED DESCRIPTION OF THE INVENTION

Figure 1:
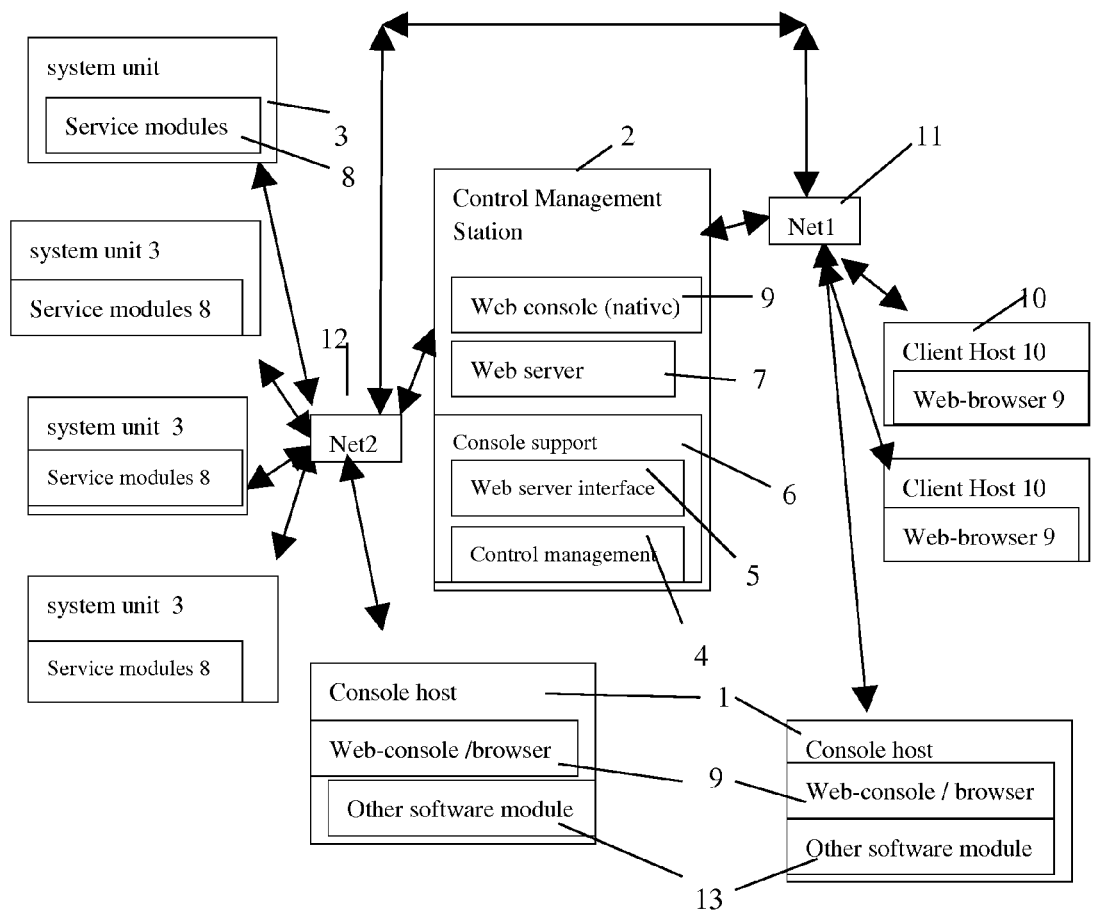
FIG. 1 shows a system view of a CCDSVM according to one embodiment of the present invention.

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the present invention.

For the convenience of describing some embodiment of the present invention, the following terminologies are provided and are manifested the limitation of present invention.

CCDSVM:

It is an abbreviation for central controlled distributed scalable virtual machine. A CCDSVM is configured to allow a control management station to control a group of systems (e.g., server computers) and provide distributed services to a client device coupled to the Intranet, the Internet or in a local area network (LAN) environment. The software components of the CCDSVM form a virtual operating environment or system.

Computer User Working Environment (CUWE):

Every computer system provides an end user a working environment which usually runs on top of a generic operating system. The CUWE allows a user to setup an authentication profile for each different user, to configure system resources from storage, network, file system, file folders structure, files and all other available resources on the system, to monitor system activities, to access applications, and to manage data files such as moving data from one folder to another folder or moving data from one system to another system and etc without limits. According to one embodiment of the present invention, a CUWE is configured to provide a multi-task mechanism. Therefore, a user can perform multiple tasks concurrently after they successful log in the CUWE.

Web-Based Computer User Work Environment (WCUWE):

The web-based computer user work environment (WCUWE) of present invention runs on top of a generic operating system in a single or multiple computers. It allows one or more users to work on one or more computers through a conventional web-browser either remotely or locally, from a device such as a laptop computer, a PDA, or a desktop computer. It provides great mobility and flexibility to the user(s). With this web-based computer user work environment, the entire CCDSVM system can operate like a single virtual machine.

Resources:

In general, resources on a computer or any other electronic device refer to, but not limited to, CPU, memory, storage device, network device, monitor or other display devices, keyboard, mouse, photo or video record devices, wireless device, user authentication profiles, and various form of deposited data in a storage device. The deposited data in a storage device could be a file system structure, folders, data files, formed raw data and etc. and is not limited to these in the present invention. A data file can be in all kinds of form, such as plain text form, binary data form, PDF form, MPEG or JPEG form, or other various image data forms, MS power point data form or Word documentation form etc. without limits. The storage device could be in any media form such as hard disk drive, magnetic tape drive, various form of memory devices, or others suitable media without limits. it should be noted, unless specifically discussed, whenever a resource in a computer, a system or a device is discussed, it means any form of computing power, data, or capacity the computer, the system or the device has or able to access.

Standard Structured Information:

A web browser can interpret data in a standard structured format (formatted information) and display the data as web pages so that people can view, manipulate, and interact with the information therein. The standard formatted information is imposed and encoded by following the syntax of a programming language such as HTML (Hypertext Markup Language), XHTML, DHTML, XML, or any other various suitable languages, whichever is best to describe the structured information without limits. In practice, these languages (HTML, XML, . . . ) themselves are often referred to as a standard for web page programming. Therefore, in this disclosure, it is not necessary to specify what standard is being used as long as data or resources are presented in a way that is suitable for web communication.

Multi-Layered Item list (MLIL):

A multi-layered item list of present invention is a logically organized information list with certain order. Each entry in an MLIL contains an item that may contain another layered list of items, where each of the items may represent a physical resource or information about a computer system or other devices. For example, the information of files and folders of a file system on a modern computer system is typically organized as a multi-layers item list and can be entirely viewed, displayed and operated in a UI display on a native system with supporting from a modern computer operating system. Likewise, each item (also referred to as a node) on an MLIL may represent a folder or a file. According to one embodiment of the present invention, the information about systems or devices on a network, the information of hardware components on a system such as disks, network cards, memory etc, the information of users of a system can be organized into an MLIL for view, display and various other operations. The supporting of the MLIL in a WCUWE makes the system resources and information much easy to be displayed, viewed, and operated in a browser. In general, an MLIL contains at least one item (node) and as many layers as needed.

The System:

The system mentioned in this invention is any type of computing device that can be a desktop computer, laptop computer, various types of servers, PDA, or cell phone or other devices with communication ability across a communication network.

The OS (Operating System):

The OS mentioned in this invention can be any suitable operating system such as Windows, Linux, various Unix, real-time operating system and others without limits.

Programming Languages:

The programming languages, which used for implementing all software mentioned in this invention, could be any suitable languages or a combination of the suitable languages such as C, C++, Java, JavaScript, Visual Basic, C sharp, HTML, XML, DHTML, XHTML, and others without limits Communication Protocols:

The communication protocols to be used in the CCDSVM could be various types that are appropriate for transmitting required data across a communication network. The communication protocols could be IP-based or non-IP-based. The IP based protocols are built on top of IP protocol that could be standard protocols such as TCP protocol, UDP protocol, ICMP protocol, and others without limits. The IP based protocols also can be non-standard proprietary protocols. The non-IP based protocols can be ISO 8473, ISO 8208, or serial communication, or data link layer protocols like LLC 802.2, or HDLC, or any proprietary protocols bellow the IP protocol level.

The Communication Protocols for Web:

The communication protocols for web computing could be HTTP, SOAP, WAP, or others without limits.

The Web Browser:

The web browser could be any existing commercial software from any vendor such as Microsoft IE, Netscape, Firefox, Mozillar, or other commercial or proprietary software. The web browser must be capable to handle web protocols such as HTTP, SAOP, WAP or others, and be able to interpret the standard structured formatted information such as web page.

The Web Server Software:

The web server software mentioned in this invention could be a commercial software from any vendor such as Apache of open source foundation, IIS of Microsoft Corporation, or others on the market, and it also can be a proprietary software. The web server software must be able to handle web protocols such as HTTP, which is a protocol built on top of TCP protocol. Therefore, the structured information for web communication can be transmitted to mentioned web browser across a communication network by the web server if the web server and web browser are located on two different systems. The web server and web browser also can communicate with each other through inter-process communication if both of the web server and web browser are located on a same computing system.

User Session With the CCDSVM:

A user session is started at a time a user login (log on) to a CCDSVM from a web-browser via an end user computing device and is ended at a time the user logout the CCDSVM from the same web browser. During a session, users can perform tasks which have been permitted and specified in a security profile for the user.

One of the objects, advantages, and benefits in the present invention is to provide a a web based computer user working environment ("WCUWE") in which users can access resources and data available in an environment including a plurality of resources and data resided on a plurality of computing systems. According to one embodiment of the present invention, such resources and data can be accessed and managed from a web-browser regardless where the users are located. In addition, such an environment permits each of multiple users from his or her own web-browser to concurrently access and manage the CCDSVM with multi-tasking capability.

Since the introduction of graphic user interface in an operating system for computers, users are able to display, view and operate data and hardware resources in a computer system or device by a pointing device (e.g., a mouse). By clicking through a multi-layered item list, such as a file or folder list displayed in Window Explore in Microsoft Windows OS, a user can navigate to an item in any level in the list. In other words, supporting a multi-layered item list has become a critical part of a native window based computer user work environment. However, within the CCDSVM, how to let multiple concurrent users to effectively simultaneously display, view or operate an item list in a single web-browser for the available resources or data, such as for deeply nested files & folders or for multi groups of provisioned systems or devices etc. is an unprecedented challenge.

Referring now to FIG. 1, it shows an exemplary simplified block diagram of an exemplary CCDSVM according to one embodiment of the present invention. As shown in the figure, the CCDSVM is a collection of computing devices including console hosts 1, a control management station 2, system units 3, and client hosts 10, all communicating via net1 10 and net2 11. Each of the elements in the CCDSVM is described in detail below with respect to FIG. 1.

Console Hosts 1:

A console host can be any system on a network and run a suitable OS. However, it must have a web browser 9 installed, where the browser 9 is used for accessing and operating the entire CCDSVM. The web-browser 9 can be implemented with any suitable or a combination of suitable programming languages. One example of the browser 9 is the Internet Explorer (IE) from Microsoft Corporation. Optionally, Web-Console is another name for the web-browser 9 on a console host 1. From the web browser 9 by following a web URL link to another system or on the same system, a user can obtain a WCUWE and further access, manage and operate the entire system. The term of the web-console used sometimes is to indicate its ability to access system information and perform system operation in the CCDSVM by privileged or authorized users. A console host 1 may also include other software modules 13, which may be implemented with any suitable programming languages. These software modules may communicate with a control management station 2 using IP based, non-IP based protocols or any suitable protocols to receive or send data between a console host and the control management station 2. To support a non-web-based networked console, the software used for the console must handle protocols other than web protocols such as HTTP, SOAP, WAP without limits. Further software modules 13 of the console host 1 must communicate with console supporting software 6 on the control management station 2. The console host 1 is similar to the client system 10 except it is dedicated to a user who takes a system administration role for the CCDSVM.

Control Management Station 2:

The control management station 2 is a computing device on the network and can have any suitable OS running on it. The control management station 2 includes web server software 7 and console supporting software 6. The console supporting software 6 includes web server interface software modules 5 and control management software modules 4. The control management station 2 may also have a Web browser used as a web-console 9. The web server software 7 is configured to send data to and receive data from the web console 9 of one of the console hosts 1 or from a web-browser of client 10.

The console supporting software 6 and the web server 7 can be implemented with any suitable or a combination of suitable programming languages. In one embodiment, the web server interface 5 of the console support software 6 may be extended to provide service as the web server software 7 does. In this case, there is no specialized web server software 7 needed.

System Unit 3:

The system unit 3 is a computing device including service software modules 8 configured to communicate with other devices on the network. For example, the service software modules 8 of the system unit 3 can communicate with the control management software 4 of the control management station 2 to carry out tasks for viewing or operating on its resource. It also can communicate with the client 10 to deliver the required services, or to communicate with another system unit 3 to transfer data and etc.

The service software modules 8 may include an individual software module configured to handle the HTTP protocol or other web protocols if there is a need for web-based communication with the client 10 or other system unit 3 or the control management station 2. This individual software module could be commercially available web server software on the market or could be a proprietary software module.

Net1 11 and Net2 12: each of Net1 and Net 2 is a network infrastructure including the Internet or the Intranet, or a local area network (LAN) and can be a wireless, wired network. or a combination of wireless and wired network. They provide the necessary means to communicate among the devices in the CCDSVM. In one embodiment, Net 1 provides communication links between the control management station 2 and the console-host 1 or the client hosts 10. It also provides communication link between the system unit 3 and the client host 10. The net1 may comprise connection media such as connecting cable of Ethernet, optical Fibre, and other; wireless communication media for providing wireless communication links through air; and data bus on circuit board. The Net1 also consists of communication equipment such as switches, routers, and adapters, etc. and all other possible elements of communication equipment without limits.

The Net2 comprises similar connection media and equipment mentioned above and provides communication links between the control management station 2 and the system units 3 or the consoles host 1. It also provides the communication link between the system unit 3 and the client host 10.

Client Host 10:

The client hosts 10 are not part of the CCDSVM, but with the permission and authorization, they can get services from and access to the CCDSVM using the web-browser 9.

The Data Flows in the CCDSVM:

According to one embodiment, there are 4 basic data flows within a typical CCDSVM:

(1) Data path 1 is a data flow through a communication link between the web browser 9 on the client host 10 or the console host 1 or the control management station 2 and the web handling software on the control management station 2, such as web-server 7 and the console support software 6. With this path of data flow, whenever the user sends a request from the web-browser 9 to the web-server 7 and further down to the console support software 6, the console support software 6 collects all required information (i.e., metadata) from a target system and converts them into standard structured information for web communication. The targeted system could be the system unit 3 or the control management station 2 itself. The information collected by the console support software 6 in the control management station 2 could be the system status, or the storage information, or the network information, or the user authentication profile, or the file system information or files and folders information on a target system. The collected information is not limited to these mentioned above herein. The console support software 6 then passes this converted structured information to the web server software 7 and further transmits them to the web-browser 9 through communication link, net1 11 or net2 12, so that it can be displayed and viewed by the conventional web browser 9.

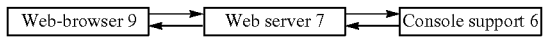

The communication protocol used between the web browser 9 in the client host 10 or the console host 1 and the web server 7 in the control management station 2 could be based on the HTTP or any other suitable protocols for web communication, which could successfully transmit the data over the web.

(2) The data path 2 is the data flow through communication link between the control management station 2 and the system units 3. With this path of data flow, the requests targeted to the system units 3 are passed from the console support software 6 in the control management station 2 to the service modules 8 in the system unit 3 through the communication link net2 12. If the responses to those requests must return back to the control management station 2, the service modules 8 in the system unit 3 carry out the requests and then send the response back to the console support software 6 in the control management station 2. The communication protocol used between the console support software 6 in the control management station 2 and the service modules 8 of the system unit 3 can be any suitable protocol for transmitting data between them. The typical data flow through this path could be a boot message, a system status, network information, or storage information in the system unit 3. It should be noted that the actual data flow though this path is not limited to those mentioned here.

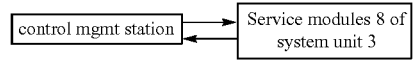

(3) The data path 3 is the data flow through a communication link between the system units 3 and the client host 10 or the console host 1. With reference to FIG. 1, in some cases, the console support software 6 of the control management station 2 may present a web link, pointing to an object on the system unit 3, to the user working on the web-browser 9 of the client host 10, the console host 1, or the control management station 2. The object pointed at by the web link on the system unit 3 could be an MPEG video, a file (e.g., a text file, PDF, MS power point or MS Word) and etc., and is not limited to these types. It could also be a link of another web service program. From the web browser 9, the user can directly access the information on the system unit 3 pointed at by the web link without going through the control management station 2 again. In this case, the service modules 8 of the system unit 3 must also include a web server software to directly support the web browser 9 access as mentioned before.

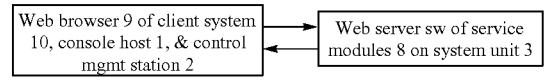

(4) The data path 4 is data flow through a communication link between the system unit 3 and another system unit 3. With this path, the service modules 8 in the system units can directly transmit data or information to the service modules 8 of the another system unit via the communication link net2 12 without going through the control management station 2. The communication protocol between the system units 3 could be IP-based or based on any suitable non-IP-based protocol. The data and information transmitted through the path 4 can be in various type such as a data file. For example, a user on the web-browser 9 may navigate through a file folder on the system unit 3. Later, the user instructs to transfer a file from a current target system unit 3 to another targeted system unit 3 by mouse clicking, therefore, the data file will be transferred directly between two system units 3 without going through the control management station 2 again.

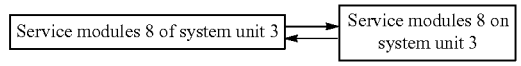

Figure 2:
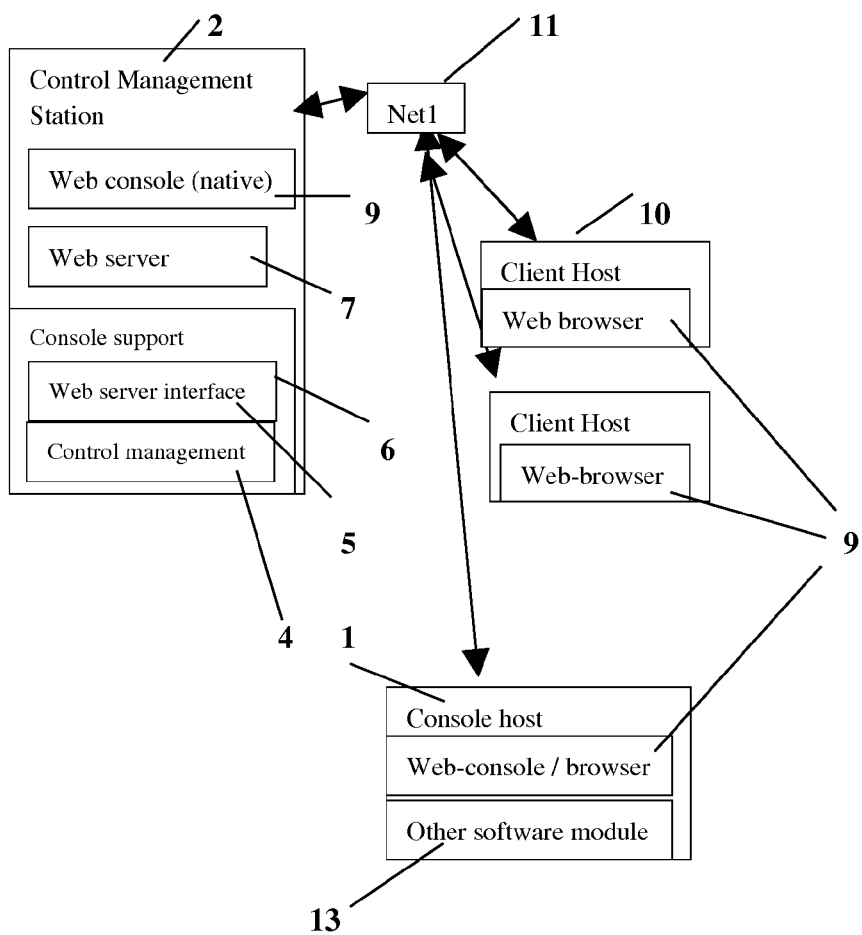
FIG. 2a shows an exemplary CCDSVM with a single control management station.
FIG. 2b shows an exemplary CCDSVM with identical client host and system unit.
FIG. 2c shows an exemplary CCDSVM with client hosts for non-web based accessing.
Figure 2:
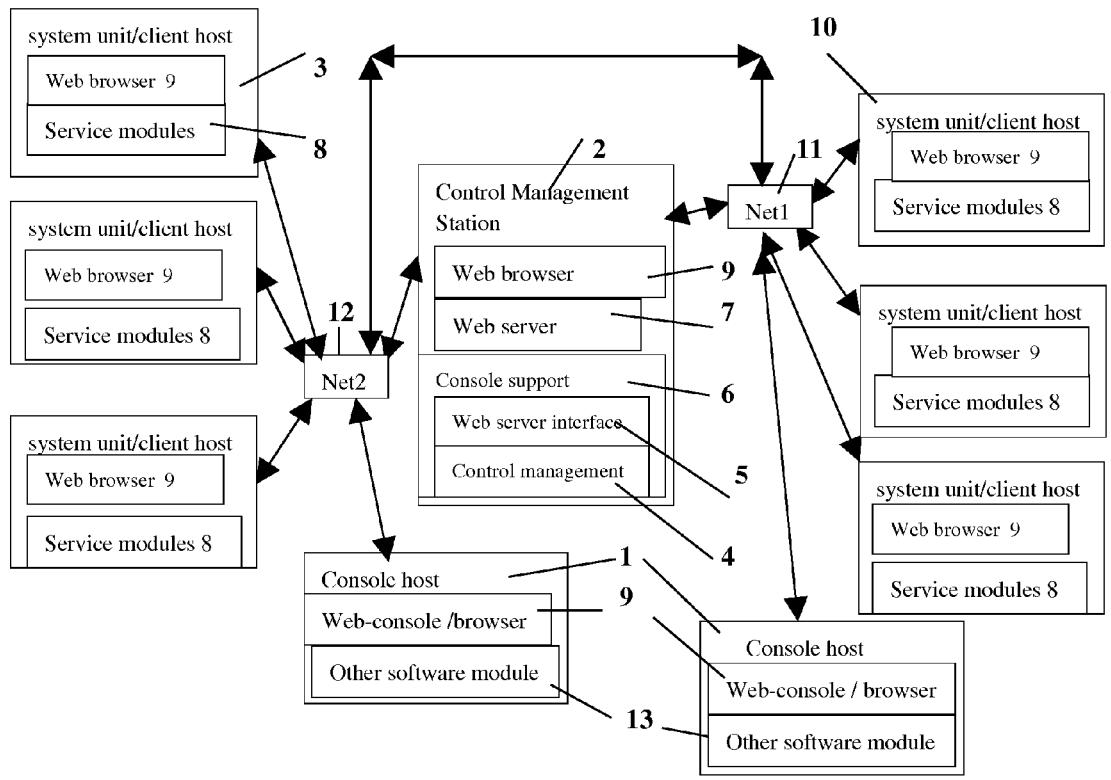
Figure 2:
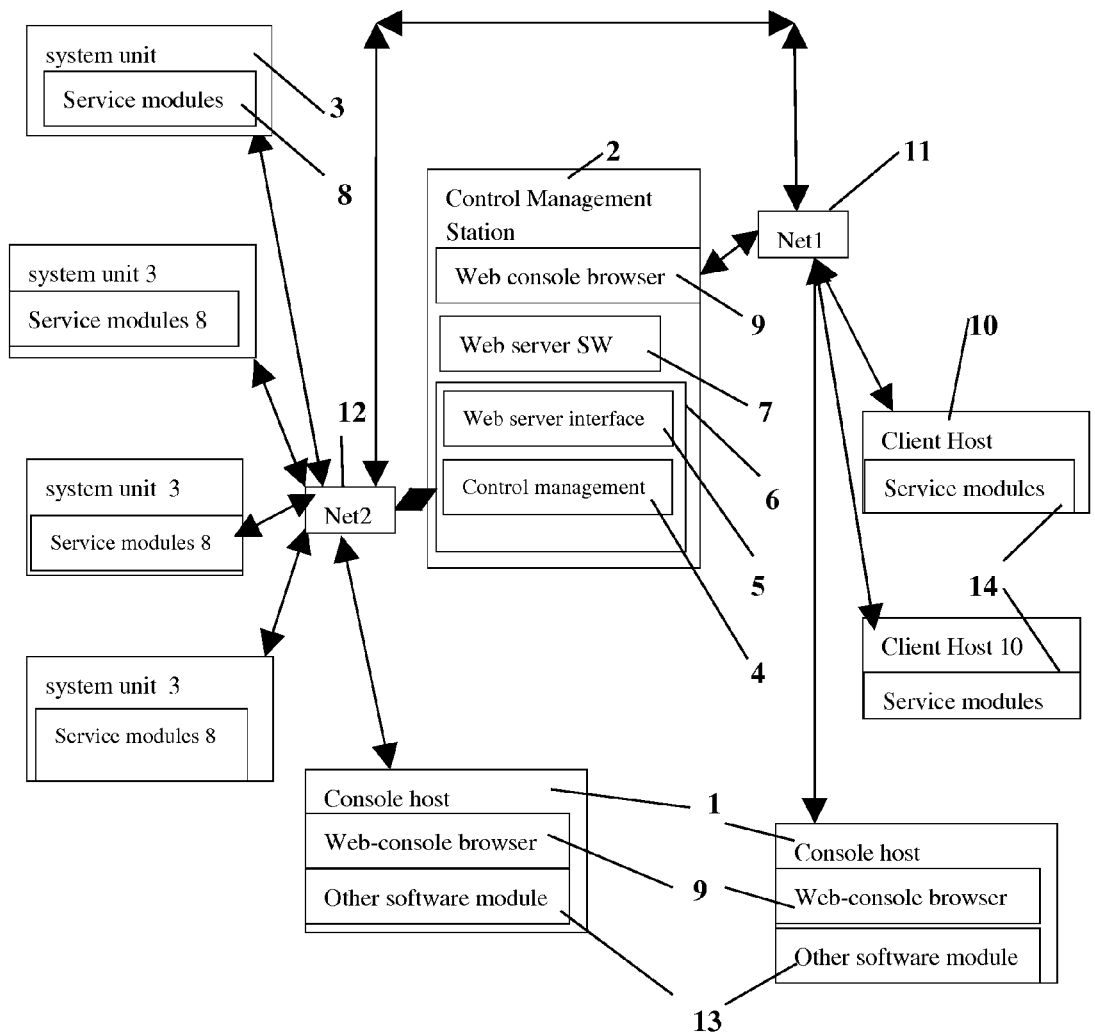

The Variation of the CCDSVM Configuration Models:

FIG. 2a shows a figure of an example of the CCDSVM with a single control management station. With this model, there is no any system unit 3, therefore, the CCDSVM degenerated into a single system and the WCUWE just works for the single system, which is the control management station 2. Thus a user from the web browser 9 of the console host 1, a client host 10, or a control management station 2 can access and operate the entire resources on the control management station 2.

FIG. 2b is a figure of an example of the CCDSVM with identical client host and system unit.

This model is substantially similar to the model of a typical CCDSVM shown in FIG. 1, except there is no difference between the client host 10 and the system unit 3 since each system unit is also configured with a web-browser 9 and each client host 10 is also configured with service modules 8. This means that each system unit/client shall play both roles of a system unit and a client host. With this model, a user on each system unit/client can login into the control management 2 from the web-browser 9 and further access and operate the resources of the control management station 2, or any other system unit/client with a security permission.

FIG. 2c is an example of the CCDSVM with non-web accessed client host. This model is substantially similar to the model of an exemplary CCDSVM shown in FIG. 1, except that the client host 10 has its own service modules 14 for non-web based access instead of using a web-browser for accessing. For example, if the system unit 3 is a SAN unit providing storage volumes, and one of the service modules 14 of the client host 10 is a driver routine for reading data from and writing data to a disk volume on the system unit 3. The client host 10 may also have a web-browser 9 to access the system unit 3 for other purposes except for accessing disk volumes.

Figure 3:
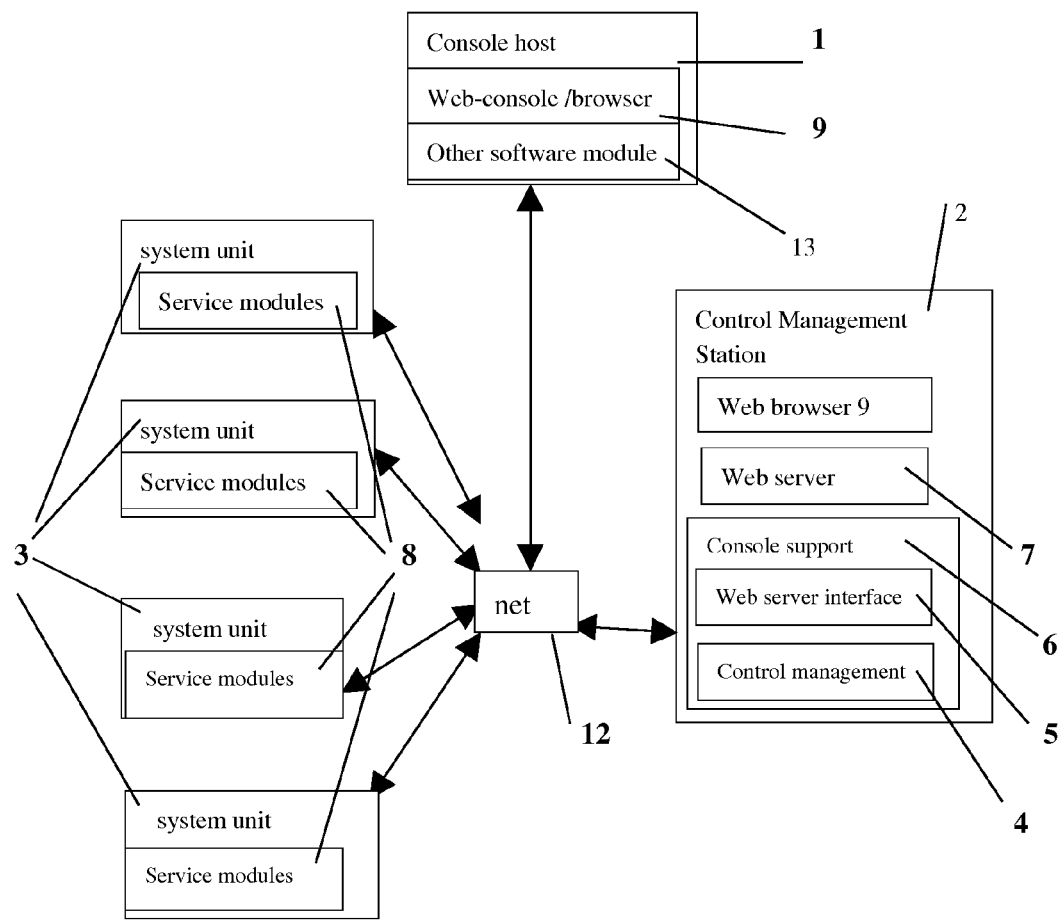
FIG. 3 is an example of functional block diagram of a WCUWE for the CCDSVM.

FIG. 3 shows an example of software modules of the WCUWE for a typical CCDSVM.
The software modules of the WCUWE can be implemented with any suitable or a combination of any suitable programming languages such C,C++, Java, JavaScript, Visual Basic, HTML, XML, etc., which means that software of the WCUWE is programming language independent.

In one embodiment, the software of the WCUWE may include following items:
1) web server interface modules 5 of the console support software 6 on the control management station 2.
2) control management modules 4 of the console support software 6 on the control management station 2.
3) web server software 7 on the control management station. The web server software 7 could be commercially available web server software on the marketing such as Apache or MS IIS or others, and also could be based on proprietary software. If the web server interface modules 5 provide compatible functionality with the web server software 7, then the web server software 7 may not be needed.
4) service software modules 8 on the system unit 3. The service software modules 8 may include web server software 7 or a software module, which provide equivalent functionality as the web server software 7 does.
5) web browser 9 on the console host 1, on the control management station 2, or on the client host 10. The web browser 9 could be a commercial web browser on the market such as MS IE, or Netscape, and also could be proprietary software modules.

FIG. 4 shows simplified examples of a Multi-Layered Item list (MLIL).
a) This is a multi-layered item list contains multiple nodes and multiple layers. A node on an MLIL can be expanded to display sub-node if there is any by mouse clicking. The sub-nodes may be reduced by mouse clicking on the same node again.
b) This is a degenerated Multi-layered items list containing a single node (i.e., a single layer).

FIG. 5 shows simplified examples of operation menu for the WCUWE of the CCDSVM.
a) A web based drop-down menu for disk volume management. The drop-down menu can be invoked by right clicking on an item (node) on MLIL.
b) A web based selective menu for system unit management. The item selected and further click the submit button.

Figure 6:
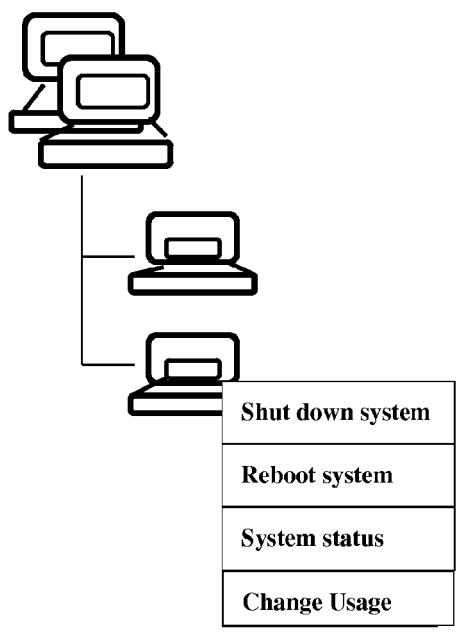
FIG. 6 shows an example of an operation menu for different types of nodes.

FIG. 6 shows simplified examples of operation menu for different types of node on an MLIL.
a) an operation menu for managing the storage (disk).
b) an operation menu for managing the file.
c) an operation menu to manage the system unit on network.

FIG. 7 shows an example of system units grouped by a group ID.
According to one embodiment, this figure shows one example of five system units being divided into two groups, a marketing group and an engineer group. The marketing group contains 2 system units while the engineer group contains 3 system units. The groups are automatically and dynamically formed when the system units boot up.

Figure 8:
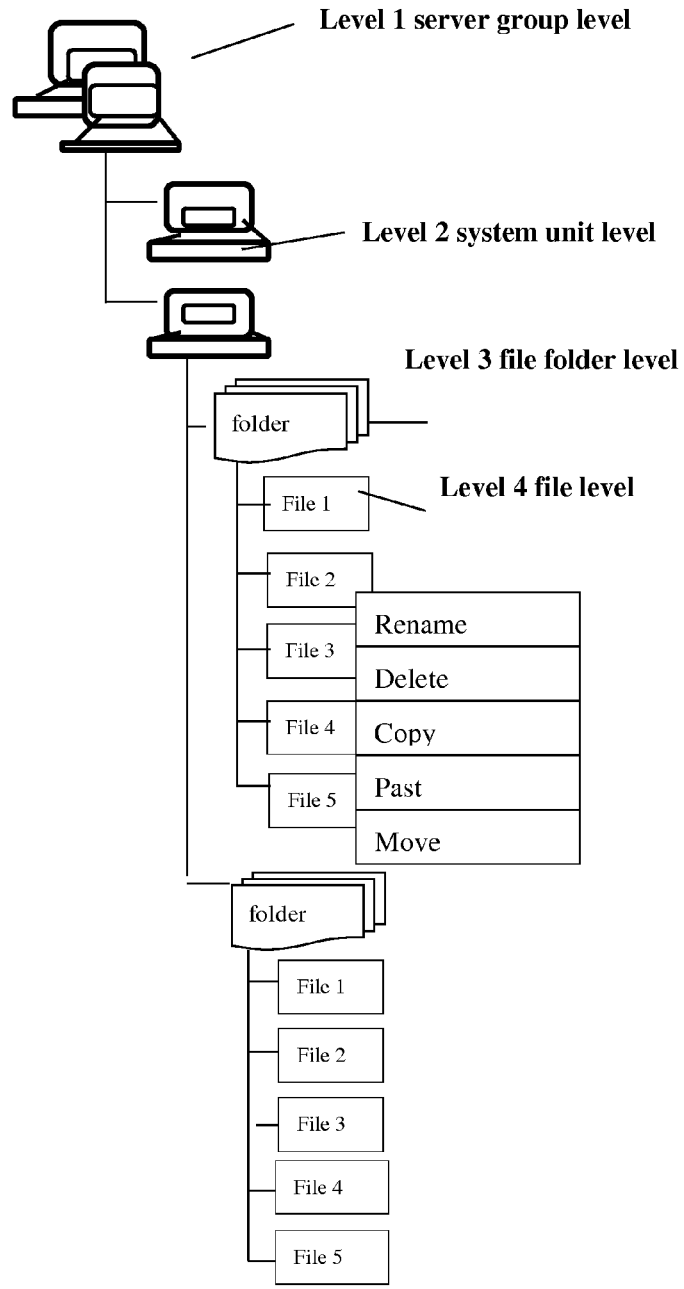
FIG. 8 shows examples of a multi-layered item list with items from other devices, system units or groups.

FIG. 8 shows an example of an MLIL combined with mixed devices, system units and system groups.
a) a top level of an MLIL is system group, the second level is system unit, the third level is device of disks.
b) a top level of an MLIL is system group, the second level is system unit, the third level start with a file folder with files.

The Initiation of WCUWE:
The WCUWE can be established via a sequence of steps, especially these steps are performed by the console support software 6 of the control management station 2 described bellow.

Referring back to FIG. 1,
according to one embodiment, the console support software 6 collects all major resources information of the control management station 2 and converted the information to a presentation in a standard structured format, which is viewable in the web-browser 9. The resources information mentioned above include the resources of the storage, network, file system, files, folders, users, system status etc, which can be collected whenever the control management station 2 is boot up or at an appropriate time. Such information may be stored in memory for fast retrieve at another time and also may be stored on permanent storage such as disks.

The console support software 6 communicates with the service modules 8 in the system unit 3 to collect all major resources information of the system unit 3 through the communication link net2. Further, the console support software 6 binds and organizes the collected information of the system units 3 into a network information list on the control management station 2. In addition, upon the access from the user, all the collected network information is organized and converted to a standard structured format for web communication, and subsequently is viewable in the web-browser 9. The collected network information includes the information of the system units 3 and their storage device, network devices, wireless devices, video and audio record & playback devices, file-system, users, system status and all others on net. The network information can be collected whenever the system units 3 is boot up or at an appropriate time.

Further, the network information list on the control management station 2 can be kept in memory for later fast access and can be organized into any suitable logical structure, for example as a simple list of array, a linked list, a double linked list, a hash table, a tree structure and etc. The network information list can also be stored on permanent storage such as disk or others for the backup purpose. In addition, the network information can be stored in any form on permanent storage. An example of the form may be a commercial database, a binary record file, a flat text ASCII file or others. All specific examples of a form for a data depository or a logical structure mentioned above are for illustration only, and they shall not be limited to these mentioned herein in this invention. After the initiation of the WCUWE, the WCUWE allows each of the users log in, from their respective web-browsers, various resources & information of the CCDSVM can be displayed, viewed, accessed, or operated.

Users Interaction, Access and Manage Resources with the WCUWE: Users of the client host 10, the console host 1, or the control management station 2 can log into the WCUWE of the CCSDVM via a web URL link provided by the software of the WCUWE (see FIG. 3). The software of the WCUWE presents information and resources on the control management station 2 and on the server units 3 to the users after their login from their own web browsers. Subsequently, whenever a user requests to access or operate a major resource either on the control management system 2 or the system unit 3 of the CCDSVM, the software modules of the WCUWE is configured to create a corresponding user task for such a request on the targeted system. In one embodiment, the software of the WCUWE is configured to support multiple simultaneous tasks for the same user from a single web-browser 9 and support multiple concurrent users each from his or her own web-browser to perform such tasks while providing best security protection for the resources being accessed by the multiple users.

The Use of Multi-Layer Item List in the WCUWE

In order to provide convenience for each of the login users to perform tasks in the WCUWE, the console support software 6 may use a logical structure of multi-layer item list (MLIL) as illustrated in FIG. 4 and use the associated web-browser based operation menu as illustrated in FIG. 5 for operating corresponding actual multi-level organized resources. The resources as mentioned before could be the file folders of a file system, the system units 3 on the network, the users and their security profile etc. If there is a need to create a structured multi-layer item list (MLIL) of FIG. 4 for resources of the CCDSCM upon each login user tries to access and operate, the console support software modules 6 of the control management station 2 are configured to do the following:

a) For each of log on sessions of each of users, a memory management module of the console support software 6 is configured to create an MLIL which can be flexibly expanded or reduced by mouse clicking thereon while being displayed in a web browser. Further, the console support software 6 makes an association between each created logical structure of the MLIL and the actual targeted resources. The created MLIL can reside in memory and can be in any form of a list structure such as a simple array list, link list, double link list, various tree structure, or hashed table, etc.

b) For each created MLIL, binding a corresponding graphic or text representation to each node (item) on the MLIL for the purpose of displaying, and associating each node (item) with appropriate attributes. These attributes shall reflect characteristics of the actual resources, such as name, type, level, size etc. and of course it is not limited to these, therefore, the resources can be correctly displayed through the MLIL.

c) A corresponding operation menu is associated with each node of the MLIL. The operation menu can be either a web-based drop-down menu 1 as shown in FIG. 5 or a non-drop-down selective menu 2 as shown in FIG. 5.

d) The created MLIL and all its associated information are converted into the standard structured information for web communication, such that to be viewable in and accessible via the web-browser 9. Thereafter, the MLIL can be either viewed in a web-browser 9 on the control management station 2 or viewed by a web-browser 9 on the client host 10 or the console host 1. The converted logical item list needs to be transmitted via a communication link net1 11 or net2 12 from the control management station 2 to the client host 10 or the console host 1. The converted logical item list can be transmitted using a web protocol such as HTTP or any other suitable protocols in order for users remotely view it from the web-browser 9.

e) After user taking action of either viewing, or operating on any of resources represented by the MLIL, the console support software 6 modifies the MLIL through the memory management module of the console support software 6. Also, the memory management module of the console support software 6 keeps tracks of the memory usage and status for the correspondent MLIL as the results of expanding or reducing the MLIL when a user accesses or operates a resource represented by this MLIL. For example, deleting a file folder operation requires to delete an actual folder on a file system and delete the corresponding node on the MLIL. Most importantly, all processes or threads created to perform tasks of operating on the resources represented by the MLIL can effectively share the dynamically modified same MLIL with a consistent view throughout the entire login session of a login user. The memory management module of the console support software 6 may need to translate and map the initial logical memory address of the MLIL to another logical memory address, therefore, the different processes or threads of the same user session can effectively access the same actual MLIL memory object during the user session.

f) The operations described from b) to e) above can be repeatedly processed as long as a user keeps working on the same resource represented by this specific MLIL.

For each of logout users, the created MLIL for the user session will be deleted through the memory management module of the console support software 6. Further if a user stops accessing the current related resource and requests to access a total different resource, the original MLIL will be deleted and a new MLIL will be created.

The Support of Deeply Nested Files & Folders Lists on Systems within the WCUWE of the CCDSVM:

The accessing and managing a file system always has been an important part of a computer user work environment (CUWE) in the past. Supporting a file system to be accessed by users from a network has always being a challenge to many vendors. With the present invention, a user can manage storage volumes of the entire CCDSVM from a web browser 9 and further can create, manage, and access the file system on either the control management station 2 or the system unit 3. With a sophisticate method of using the multi-layer item list as shown FIG. 4 together with the operation menu shown in FIG. 5 for the file system in the WCUWE of the CCDSVM in this invention, users can efficiently access and manage files and folders in file systems from a web-browser 9 on the fly without caching anything for the file system.

In one embodiment, the multi-layer item lists (MLIL) being used to represent an actual file folder structure of a file system on a target system of the CCDSVM has each node (item) to represent a folder or a file system or a file. When a user navigates through the file system and uses mouse-clicking on the MLIL to operate a file or folder from a web-browser 9, only a small piece of information, which is related to the file or folder, needs to be retrieved or transmitted between a target system of the CCDSVM and the control management station 2. For example, if user wants to add or delete an item such as a folder, the only major information needs to be transmitted is a folder name from the control management system 2 to the target system and the target system shall carry out the task. If a user wants to access the information, which is bellow a current item on the MLIL, such as a folder, after sending a folder name, the only information that needs to be retrieved from the target system is the sub-folder or file names if there is any under the current folder. If the user wants to set access permission for a file or a folder on any of target systems for one or more designated users to access, the information of the targeted system and information of the file or folder on the network need to be bound with each designated user's security profile. The target systems could be either the control management station 2 or any of the system units 3 in the CCDSVM.

If a user needs to view or edit the content of a file on a system unit 3, the file may be transmitted via the communication link net 1 & net 2 directly from the target system to the client host 10 or the console host 1, without going through the control management station 2. If the file is on the control management station 2 and users like to view or edit it from a remote system, the file is transmitted via the communication net 1 to the client host 10 or the console host 1. With a proper viewing tool on the client host 10 or the console host 1 or the control management station 2, which may be invoked from the web-browser 9, the user is able to view the contents of the file. With a proper editor, user can further edit the file and then transmit the file back to the target system. The target system could be either the system unit 3 or the control management station 2. Alternatively, the file may also be transmitted from the target system to the control management station 2 and then convert it from original format to a format, which may be viewed and edited in the web-browser 9. After converting, if the target system is not the control management station 2, the file can be transmitted via the communication link net 1 or net 2 from the control management station 2 to the client-host 10, the console host 1 for viewing or editing with a web-browser 9. If the target system is the control management station 2 itself, there would be no such transmission required.

The Support of the Automatically & Dynamically Provisioned Groups of Systems in the WCUWE of the CCDSVM:

Network information is an important part of a WCUWE. In one embodiment, the server unit 3 of the CCDSVM can be automatically and dynamically provisioned into multiple groups based on their group ID, where each group contains at least one server unit 3 ("provisioned system").

To effectively access and manage such grouped system units 3 and their associated devices, such as storage or network interface cards or terminal monitor or video & audio recorder (e.g., camcorder, or keyboard & mouse), or wireless devices or file systems on the network, the multi-layer item list (MLIL) can be used. Therefore, in one embodiment, the mixed information on the network can be ordered with a top-down fashion from the server-group at top level, the system units 3 at the second level, and the devices or file system start from the third level and so on with the MLIL.

More specifically, a node on the MLIL with different levels or types may associate with a different type of an operation menu. For example, a node of the system unit 3 on an MLIL may be associated with an operation menu containing system status, shutdown, storage management, change usage etc. and a node of storage device may be associated with an operation menu of creating a storage volume, displaying storage volume, and delete a storage volume and so on. After converting all information associated with the MLIL to a standard structure, the complex information on the network can be viewed and operated by a user from a web-browser 9.

For example, FIG. 7 shows the example of how each of the system units 3 is provisioned into multiple groups. FIG. 8 shows the example of how a device such as storage being listed under the server units 3 in each group. FIG. 9 shows an example of how the file system on a system unit 3 in a group can be accessed. As described herein, one embodiment of automatically and dynamically grouping each of the system units 3 and wisely using the MLIL to represent the diversified resources on the network, the entire CCDSVM can be much more efficiently accessed, operated, and managed. For example, through mouse clicks on a web-browser, privileged users can create storage volumes from a fresh disk on any target system and make a file system on each of the storage volumes, mount the file system and create a folder structure on the file system, and further setup an access control on the file system for users with limited privileges to access. Therefore, the WCUWE can securely let permitted user access from a web-browser anywhere on the network.

The Support of the User Administration & Authentication in a WCUWE of the CCDSVM:

Initially, a WCUWE allows a default super user to login the WCUWE of the CCDSVM and to access an authentication web-page provided by the console support software 6. This privileged user can setup other privileged or non-privileged users account and their respective profiles thereafter. Similar to a file system in the WCUWE of the CCDSVM, a user profile can be viewed and operated with using an MLIL combined with a web-based operation menu as shown in FIG. 5, and further to convert it to a standard structure, which can be viewed and accessed by the user from a web-browser 9. Therefore, through mouse click on the MLIL pertaining to the user profiles and a web-based operation menu in a web page, the user can perform operations of user profile creating, viewing, updating, deleting and others without limits. Specially, the privileged users can setup profiles for other non-privileged users for the secure access control. In addition, the user information and their security profiles can be kept in any form in a database, which could be a commercial database on the market, or a plaint text file, or a binary record file, or others.

The present invention has been described in considerable details with preference to certain preferred versions, examples, and figures; however, other versions, and samples are also possible. Therefore, the spirit and scope of the appended claims should not be limited to the description of the preferred versions and samples contained herein.

What is claimed is:

1. A method for access to resources in a computing environment, the method comprising:

creating, by a server for a log on session of a first user, a first hierarchical list to represent, in a reduced form, a first resource structure in the computing environment, wherein the server makes an association between the created first hierarchical list and the actual first resource structure, and the first hierarchical list is created in memory of the server in the form of one of a simple array list, a link list, a double link list, or a hashed table, and displaying via a web page a user interface comprising the first hierarchical list on a first access device for the user session after the first user via the first access device logged into the server, wherein the displayed first hierarchical list is navigable by the first user for selecting a resource from the first hierarchical list displayed and requesting access to the selected resource in the first resource structure during the user session; and processing the request, for access to the selected resource in the first resource structure received from the first access device to carry out the access to the selected resource, wherein the process of the request includes update the first hierarchical list and update the first resource structure in accordance to the request, where the update of the first hierarchical list includes updating the displayed user interface to comprise the updated first hierarchical list to reflect the updated first resource structure.

2. The method as recited in claim 1, wherein said hierarchical list is expandable and reducible in response to the hierarchical list being navigated with mouse-like clicking during said user session.

3. The method as recited in claim 1, wherein said first resource structure further comprises a plurality of computing devices coupled to a network, and resources of the first resource structure are distributed among the computing devices in the computing environment.

4. The method as recited in claim 1, wherein said creating the first hierarchical list further comprising:
creating the first hierarchical list in the memory for the user session updating the first hierarchical list in the memory during the user and deleting the first hierarchical list from the memory upon an exit of the user session.

5. The method as recited in claim 1 further comprising:
creating a second hierarchical list to represent a second resource structure in the computing environment in response to the first user access to the second resource structure during the user session.

6. The method as recited in claim 1, further comprising:
creating a second hierarchical list to represent the first resource structure for a user session associated with a second access device to allow a second user through the second hierarchical list displayed on the second access device to request access to the resources in the first resource structure.

7. The method as recited in claim 1, wherein the server sends, via the web page, the user interface to the first access device to cause the first hierarchical list to be displayed in a web browser screen on said first access device.

8. The method as recited in claim 3, wherein the resources are about computing power of a CPU available at one of the computing devices, a memory capability, a capacity of a storage device, what characteristics of a network device, a monitor or other devices and files in the storage including application program, text, document, video, and photo image files.

9. The method as recited in claim 3, wherein said resources comprises a plurality of file objects being distributed among the plurality of computing devices coupled to a network in the computing environment, wherein each of the file objects is a file or a folder including subfolder.

10. The method as recited in claim 4, wherein the first hierarchical list further comprises a plurality of nodes, at least one of the nodes including attributes about one of the resources in said first resource structure, the attributes displayable in a web browser screen.

11. A server supporting access to web based folder structure, the server comprising:
memory, and
program code in a storage medium which, when executed by the server causes the server to:
create, for a log on session of a first user a first hierarchical list to represent a first folder structure stored in a first storage space, wherein the server makes an association between the created first hierarchical list and the actual first folder structure, and the first hierarchical list is created in the memory of the server in the form of one of a simple array list, a link list, a double link list, or a hashed table, and
display via a web page a user interface comprising the first hierarchical list on a first access device for the user session after the first user via the first access device logged into the server,
wherein the first folder structure comprises one or more folders, where each of the one or more folders is used for storing at least one file and allowed at least one subfolder to be created therein, and
wherein the displayed first hierarchical list is navigable by the first user for selecting a file object from the hierarchical list displayed and requesting access to the selected file object in the first folder structure during the user session; and
process the request, for access to the selected file object in the first folder structure received from the first access device to carry out the access to the selected file object,
wherein the program code to process the request includes program code to update the first hierarchical list and update the first folder structure according to the request, wherein the update of the first hierarchical list includes updating the displayed user interface to comprise the updated first hierarchical list to reflect the updated first folder structure.

12. The server of claim 11, wherein the server is configured with one or more storage devices, where each of the one or more storage devices is partitioned with one or more storage spaces.

13. The server of claim 11, wherein said access via the displayed first hierarchical list to a selected file object comprises:
access to a selected folder in the first folder structure for storing a file therein or retrieving a file therefrom.

14. The server of claim 11, wherein said access via the displayed first access to a selected file object comprises:
Access to a selected folder in for creating a subfolder in a the selected folder for the first folder structure.

15. The server of the claim 11, wherein the server creates a second hierarchical list to represent a second folder structure in a second storage space for a user session associated with a second access device to allow the second user via the second hierarchical list displayed thereof to request access to the second folder structure.

16. The server of claim 11, wherein said creating the first hierarchical list further comprises:
creating the first hierarchical list in the memory for the user session, updating the first hierarchical list in the memory according to a received request during the user session, and deleting the first hierarchical list from the memory upon an exit of the user session.

17. The server of claim 11, wherein said display of the first hierarchical list further comprises:
displaying the first hierarchical list on the first access devices with multiple layers without a limitation for the first hierarchical list being displayed with a maximum of only two layers.

18. The server of claim 13, wherein said access, via the displayed first hierarchical list, to a selected file object comprises:
access to a selected file or folder for sharing the selected file or folder in the first folder structure with at least a designated user.

19. The server of claim 13, wherein said access via the displayed first hierarchical list, to a selected file object further comprises:
access to a selected file in the first folder structure for editing content of the selected file, wherein the selected file is converted from an original format into a web editable format before being edited.

20. The server of claim 13, wherein said access via the displayed first hierarchical list, to a selected file object further comprises:
  access to a selected file or folder for copying, pasting, removing or renaming the selected file or folder in the first folder structure.

21. The server of claim 15, wherein each of the first and second access devices is one of a wireless personal communication device, a laptop computer, a desktop computer, or a server, and is operable to execute a web browser to display a hierarchical list received from the server.

22. The server of claim 16, wherein the first hierarchical list comprises a plurality of nodes, at least one of the nodes including attributes about one of the resources in the first resource structure the attributes displayable in a web browser screen.

23. The server of claim 18, further comprising:
  adding, by the server in response to the request for the sharing, information of the selected file or folder into a profile associated with the designated user for permitting the designated user access to the file object selected.

24. The server of claim 22, wherein said at least one of the nodes further associates with a graphic indicator and an operation menu, each of the graphic indicator and the operation menu are displayable in a web browser screen.

25. The server of claim 23, further comprising:
  allowing the designated user via an user interface displayed on an associated access device, access to the file or folder by the first user in respect to the permissions specified for the file or folder the profile associated with the designated user.

26. The server of claim 25, wherein the user interface for the first user is updated upon the first user made a change to the file object, and wherein the user interface for the designated user is also updated when the designated user is allowed access to the file object shared by the first user.

27. A computer program product comprising:
  a non-transitory computer-readable medium comprising:
    program instructions that, when executed by a server cause the server to:
      create, for a log on session of a first user, a first hierarchical list to represent a first folder structure stored in a first storage space, wherein the server makes an association between the created first hierarchical list and the actual first folder structure, and the first hierarchical list is created in memory of the server in the form of one of a simple array list, a link list, a double link list, or a hashed table, and
      display via a web page a user interface comprising the first hierarchical list on a first access device for the user session after the first user via the first access devices logged into the server,
        wherein the first folder structure comprises one or more folders, where each of the one or more folders is used for storing at least a file and allowed at least a subfolder to be created therein,
        wherein the displayed first hierarchical list is navigable by the first user for selecting a file object from the first hierarchical list displayed and requesting access to the selected file object in the first folder structure during the user session; and
      process the request for access to the selected file object in the first folder structure received from the first access device to carry out the access to the selected file object,
      wherein the program instructions to process the request include program instructions to update the first hierarchical list and update the first folder structure in accordance to the request, wherein the update of the first hierarchical list includes updating the displayed user interface to comprise the updated first hierarchical list to reflect the updated first folder structure.

28. The program product of claim 27, wherein the program instructions further cause the server to
  display content of a selected folder in the first folder structure wherein the content of the selected folder comprises at least one first file, and/or one first subfolder, the first subfolder operable to have at least one second file or one second subfolder.

29. The program product of claim 27, wherein the program instructions cause the server to create the first hierarchical list in a memory,
  update the first hierarchical list in the memory according to a received request, and delete the first hierarchical list from the memory in response to an exit of the user session.

30. The program product of claim 27, wherein the program instructions cause the server to:
  allow the first user via the displayed first hierarchical list access to a selected folder in the first folder structure for storing a file therein or retrieving the file therefrom.

31. The program product of claim 27, wherein the program instructions cause the server to:
  allow the first user via the displayed first hierarchical list to create a subfolder in one of the one or more folders in the first folder structure.

32. The program product of claim 27, wherein the program instructions cause the server to create a second hierarchical list to represent a second folder structure in a second storage space for a user session associated with a second access device to allow a the second user via the second hierarchical list displayed thereof access to file objects in the second folder structure.

33. The program product of claims 27, wherein the program instructions cause the server to send the user interface via the web page to the first access device to cause the first hierarchical list to be displayed on a web browser screen on the first access device.

34. The program product of claim 29, wherein the first hierarchical list objects in the first folder structure, the attributes displayable in a web browser screen.

35. The program product of claim 30, wherein the program instructions cause the server to:
  allow the first user via the displayed first hierarchical list to share a selected file or a selected folder in the first folder structure with at least a designated user.

36. The program product of claim 30 wherein the program instructions cause the server to:
  allow the first user via the displayed first hierarchical list access to a selected file in the first folder structure for editing content of the selected file and cause the server to convert the selected file from an original format into a web editable format before the selected file being edited.

37. The program product of claim 30, wherein the program instructions cause the server to allow the first user via the displayed first hierarchical list access to a selected file or folder for copying, pasting, removing, or renaming the selected file or folder in the first folder structure.

38. The program product of claim 34, wherein the one of the nodes further associates with a graphic indicator for graphically representing the one of the file objects and associated with an operation menu, each of the graphic indicator and the operation menu displayable in a web browser screen.

39. The program product of claims 35, wherein the program instructions cause the server to:
    add information of the selected file or folder into a profile associated with the designated user for permitting the designated user access to the selected file or folder shared by the first user.

40. The program product of claim 39, wherein the program instructions cause the server to:
    allow the designated user via an user interface displayed on an access device to access to the file or folder shared by the first user in respect to the permissions specified for the selected file or folder in the profile associated with the designated user.

41. The program product of claims 40, wherein the program instructions cause the server to update the user interface for the first user when the first user made a change to the shared file or folder, and update the user interface for the designated user when the designated user is allowed access to the changed file or the folder shared by the first user.

* * * * *